United States Patent
Barois et al.

(10) Patent No.: US 11,570,692 B2
(45) Date of Patent: Jan. 31, 2023

(54) METHOD, DEVICE AND SYSTEM FOR THE TRANSMISSION OF DATA FROM A DATA TRANSMITTER TO A SERVER

(71) Applicant: SAGEMCOM ENERGY & TELECOM SAS, Rueil Malmaison (FR)

(72) Inventors: Jérôme Barois, Rueil Malmaison (FR); Guillaume Juan, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 173 days.

(21) Appl. No.: 16/894,304

(22) Filed: Jun. 5, 2020

(65) Prior Publication Data
US 2020/0404579 A1  Dec. 24, 2020

(30) Foreign Application Priority Data

Jun. 19, 2019 (FR) ........................................ 1906610

(51) Int. Cl.
| | | |
|---|---|---|
| *H04W 4/00* | (2018.01) | |
| *G06F 15/16* | (2006.01) | |
| *H04W 48/08* | (2009.01) | |
| *H04L 1/00* | (2006.01) | |
| *H04W 24/02* | (2009.01) | |
| *H04W 28/02* | (2009.01) | |

(Continued)

(52) U.S. Cl.
CPC ............ *H04W 48/08* (2013.01); *H04L 1/0026* (2013.01); *H04W 24/02* (2013.01); *H04W 28/0268* (2013.01); *H04W 36/06* (2013.01); *H04W 36/30* (2013.01)

(58) Field of Classification Search
CPC . H04W 48/08; H04W 24/02; H04W 28/0268; H04W 36/06; H04W 36/30; H04L 1/0026
USPC ......................................................... 370/329
See application file for complete search history.

(56) References Cited

U.S. PATENT DOCUMENTS 5,142,550 A * 8/1992 Tymes ................. G06K 7/0008
370/479
6,163,694 A * 12/2000 Lind ..................... H04W 48/20
455/435.3

(Continued)

FOREIGN PATENT DOCUMENTS

WO       2018/094255 A1    5/2018

*Primary Examiner* — Mark G. Pannell
(74) *Attorney, Agent, or Firm* — Oliff PLC

(57) ABSTRACT

A method for the transmission of data from a data transmitter to a server by means of a cellular network using frequency sub-bands. A modem selects at least one sub-band from among the frequency sub-bands of the frequency plane, the transmitter obtains at least one frequency sub-band selected, the transmitter obtains information representing the quality of service of the connection between the transmitter and the server, the transmitter checks whether the information representing the quality is superior to or equal to a predetermined quality level, the transmitter notifies the modem of a prohibition of selection of at least one previously selected frequency sub-band if the information representing the quality of service of the connection between the transmitter and the server is inferior to the predetermined quality level.

5 Claims, 4 Drawing Sheets

(51) Int. Cl.
*H04W 36/06* (2009.01)
*H04W 36/30* (2009.01)

(56) References Cited

U.S. PATENT DOCUMENTS

| | | | | |
|---|---|---|---|---|
| 6,975,865 | B1* | 12/2005 | Vaisanen | H04W 16/16 |
| | | | | 455/450 |
| 2009/0253376 | A1* | 10/2009 | Parssinen | H04W 72/02 |
| | | | | 455/62 |
| 2011/0010439 | A1* | 1/2011 | Cheifot | H04L 61/00 |
| | | | | 709/223 |
| 2011/0158110 | A1 | 6/2011 | Stacey et al. | |
| 2012/0275326 | A1* | 11/2012 | Vedantham | H04W 72/0453 |
| | | | | 370/252 |

* cited by examiner

METHOD, DEVICE AND SYSTEM FOR THE TRANSMISSION OF DATA FROM A DATA TRANSMITTER TO A SERVER

TECHNICAL FIELD

The present invention relates to a method, a device and a system for the transmission of data from a data transmitter to a server with at least one predetermined quality-of-service level.

PRIOR ART

Selecting an operating mode of a network modem for establishing a communication by means of a cellular network generally relies on algorithms of the 3GPP standard such as for example the 3GPP document TS 23.122 and more particularly on the part entitled "Automatic Network Selection Mode Procedure".

The logic applied by these algorithms does not always lead to obtaining the best choice for the type of communication. There may for example be a tendency to favour the obtaining of a good communication quality for voice rather than a good data communication quality. For communications involving only the transfer of data, the choice made by these algorithms may thus not be optimal.

Some algorithms, modems or SIM parameters favour the latest-generation networks such as the 4G network with respect to the 3G network. This is sometimes detrimental when a 4G network is available with a low data rate whereas a 3G network enabling a higher data rate is present.

In other words, it is possible to end up choosing a connection in the best access technology available even if it offers an insufficient quality of service for the use that it is wished to make thereof.

In order to overcome this problem, many cellular telephones leave to the user the possibility of manually selecting the access technologies enabled. When he finds that his connection is established but of very poor quality (poor bitrate), the user of the mobile telephone may force a connection to another network.

DISCLOSURE OF THE INVENTION

The aim of the present invention is to solve the drawbacks of the prior art by proposing a method, a device and a system for the transmission of data from a data transmitter to a server with at least one predetermined quality-of-service level that makes it possible to choose the frequency sub-bands that enable the transmission of the data at least with this quality level and which also makes it possible to determine whether an action on the transmitter must be performed if no frequency sub-band makes it possible to achieve the quality level.

To this end, according to a first aspect, the invention proposes a method for the transmission of data from a data transmitter to a server with at least one predetermined quality-of-service level, the data being transmitted by means of a cellular network using frequency sub-bands, characterised in that the method comprises the steps performed by the transmitter of:

selecting, by a modem of the transmitter, of at least one sub-band from among the frequency sub-bands of the frequency plane enabled for the transmission of data to the server, obtaining, by the transmitter, of at least one selected frequency sub-band, obtaining of information representing the quality of service of the connection between the transmitter and the server, checking, by the transmitter, whether the information representing the quality of service of the connection between the transmitter and the server is superior to or equal to a predetermined quality level, transferring, by the transmitter, of the data to the server if the information representing the quality of service of the connection between the transmitter and the server is superior to or equal to the predetermined quality level, notifying to the modem, by the transmitter, of a prohibition of selection of at least one previously selected frequency sub-band if the information representing the quality of service of the connection between the transmitter and the server is not superior to or equal to a predetermined quality level, performing, by the transmitter, of the selecting, obtaining and notification steps as long as the information representing the quality of service of the connection between the transmitter and the server is not superior to or equal to the predetermined quality level.

The invention also relates to a device for the transmission of data from a data transmitter to a server with at least one predetermined quality-of-service level, the data being transmitted by means of a cellular network using frequency sub-bands, characterised in that the device comprises:

means for the selecting, by a modem of the device, of at least one sub-band from among the frequency sub-bands of the frequency plane enabled for the transmission of data to the server, means for obtaining at least one selected frequency sub-band, means for obtaining information representing the quality of service of the connection between the transmitter and the server, means for checking whether the information representing the quality of service of the connection between the transmitter and the server is superior to or equal to a predetermined quality level, means for transferring data to the server if the information representing the quality of service of the connection between the transmitter and the server is superior to or equal to the predetermined quality level, means for notifying to the modem a prohibition of selection of at least one previously selected frequency sub-band if the information representing the quality of service of the connection between the transmitter and the server is not superior to or equal to the predetermined quality level, means for activating the selection, obtaining and notification means as long as the information representing the quality of service of the connection between the transmitter and the server is not superior to or equal to the predetermined quality level.

The invention also relates to a system for the transmission of data from a data transmitter to a server with at least one predetermined quality-of-service level, the data being transmitted by means of a cellular network using frequency sub-bands, characterised in that the system comprises:

means, included in the transmitter, for the selecting, by a modem of the transmitter, of at least one sub-band from among the frequency sub-bands of the frequency plane enabled for the transmission of data to the server, means, included in the transmitter, for obtaining at least one frequency sub-band selected, means for obtaining information representing the quality of service of the connection between the transmitter and the server, means, included in the transmitter, for checking whether the information representing the quality of service of the connection between the transmitter and the server is superior to or equal to a predetermined quality level, means, included in the transmitter, for transferring of data to the server if the information representing the quality of service of the connection between the transmitter and the server is superior to or equal to the predetermined quality level, means, included in the transmitter, for the notifying to the modem of a prohibition of selection of at least one previously selected frequency sub-band if the information representing the quality of service of the connection between the transmitter and the server is not superior to or equal to a predetermined quality level, means, included in the transmitter, for activation of the selecting, obtaining and notification means as long as the information representing the quality of service of the connection between the transmitter and the server is not superior to or equal to the predetermined quality level, means, included in the server, for notifying of an absence of reception of data from the transmitter.

Thus the present invention makes it possible to choose the frequency sub-bands that enable the transmission of the data with a predetermined quality level and makes it possible to determine whether the transmitter must be acted on if no frequency sub-band makes it possible to achieve the quality level.

By iteratively performing the selecting, obtaining and notification steps as long as the information representing the quality of service of the connection between the transmitter and the server is not superior to or equal to the predetermined quality level, any transfer of data to the server is prevented as long as the quality of service of the connection is not obtained. The server, in detecting an absence of reception of data, can thus notify that an action must be performed in order to improve the quality of the communication. The action is for example the installation of a more efficient antenna.

According to a particular embodiment, if all the frequency sub-bands of the frequency plane are prohibited, the method further comprises the step of notifying, by the transmitter to the modem, that the prohibited frequency sub-bands can once again be selected, and performing the selection, obtaining and notification steps as long as the information representing the quality of service of the connection between the transmitter and the server is not superior to or equal to the predetermined quality level.

According to a particular embodiment of the invention, the information representing the quality of service of the connection between the transmitter and the server is determined by sending TCP or UDP data packets of minimum or maximum size.

According to a particular embodiment of the invention, the transmitter is included in a data concentrator concentrating data received from a plurality of electricity meters.

According to a particular embodiment of the invention, the method further comprises a step of notifting by the server of an absence of reception of data from the transmitter.

The invention also relates to the computer programs stored on an information carrier, said programs comprising instructions for implementing the previously described methods, when they are loaded into and executed by a computer system.

BRIEF DESCRIPTION OF THE DRAWINGS

The features of the invention mentioned above, as well as others, will emerge more clearly from the reading of the following description of an example embodiment, said description being given in relation to the accompanying drawings, among which.

The system is a system for collecting data from smart electricity meters $Ce1$, $Ce2$, $Ce3$, $Ce4$ and $Ce5$ by a data concentrator $Cd$ that transfers the concentrated data to a server Serv.

The data from the electricity meters $Ce1$, $Ce2$, $Ce3$, $Ce4$ and $Ce5$ are obtained by the data concentrator $Cd$ by means of a powerline connection.

The concentrator $Cd$ next transfers the data to the server Serv by means of a cellular wireless network only if the quality of the connection provided by the cellular wireless network is at least equal to a predetermined quality level.

Figure 1:
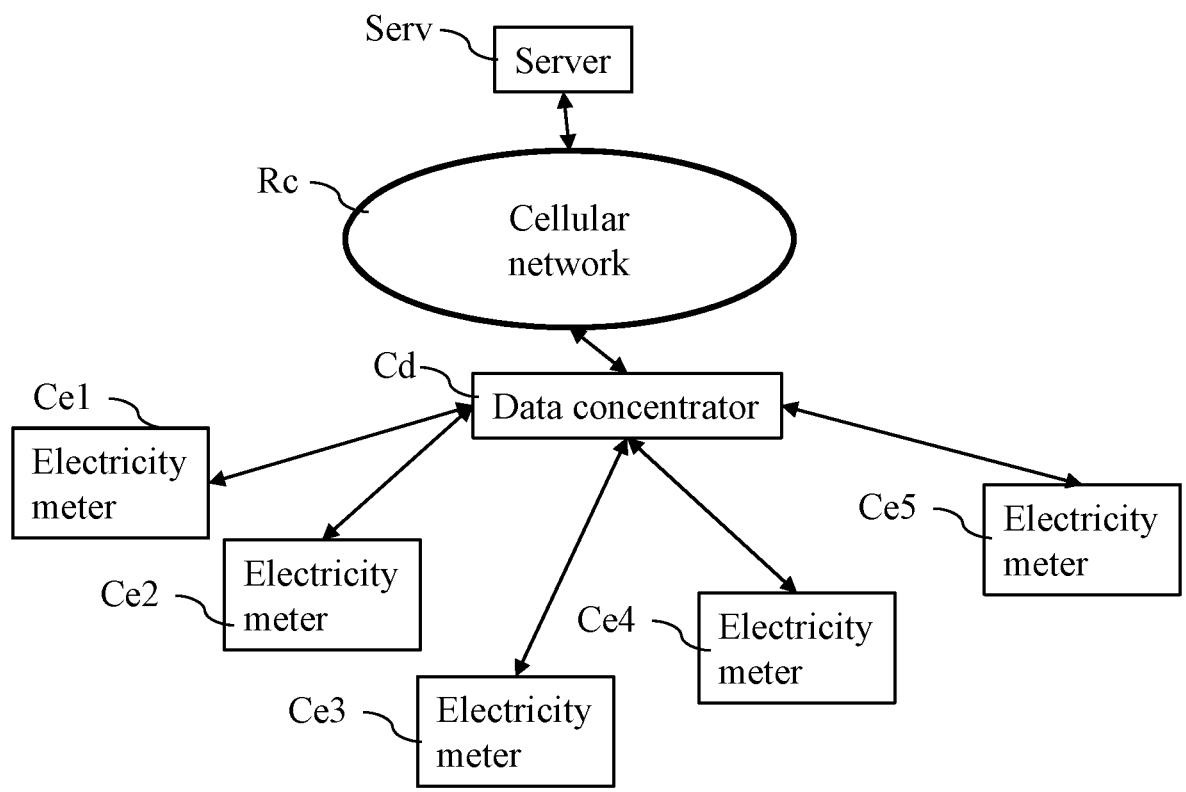
FIG. 1 depicts a system wherein the present invention is implemented.
Figure 2:
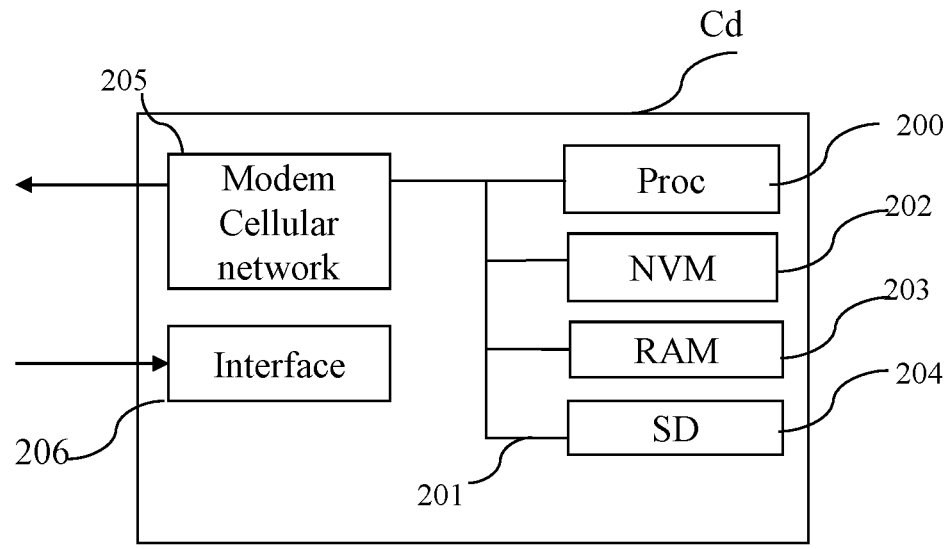
FIG. 2 depicts an example of architecture of a data concentrator wherein the present invention is implemented.

FIG. 2 shows an example of architecture of a data concentrator wherein the present invention is implemented.

The concentrator $Cd$ comprises:
a processor, microprocessor or microcontroller 200;
a volatile memory 203;
a non-volatile memory NVM 202 such as for example a ROM and/or flash memory;
optionally, a storage medium reader 204, such as an SD card (Secure Digital card) reader or a hard disk;
a modem 205 for communication with the cellular network Rc;
an interface 206 for communication with the electricity meters Ce;
communication bus 201 connecting the processor 200 to the non-volatile memory 202, to the RAM memory 203, to the storage medium reader 204, to the modem 205 and to the interface 206.

The communication modem is for example a modem marketed by the company Gemalto© under the reference PLS8-E.

The processor 200 is capable of executing instructions loaded in the volatile memory 203 from the non-volatile memory 202, from an external memory (not shown), from a storage medium, such as an SD card or the like, or from a communication network. When the concentrator Cd is powered up, the processor 200 is capable of reading instructions from the volatile memory 203 and executing them. These instructions form a computer program that causes the implementation, by the processor 200, of all or part of the method described in relation to FIG. 4.

Figure 4:
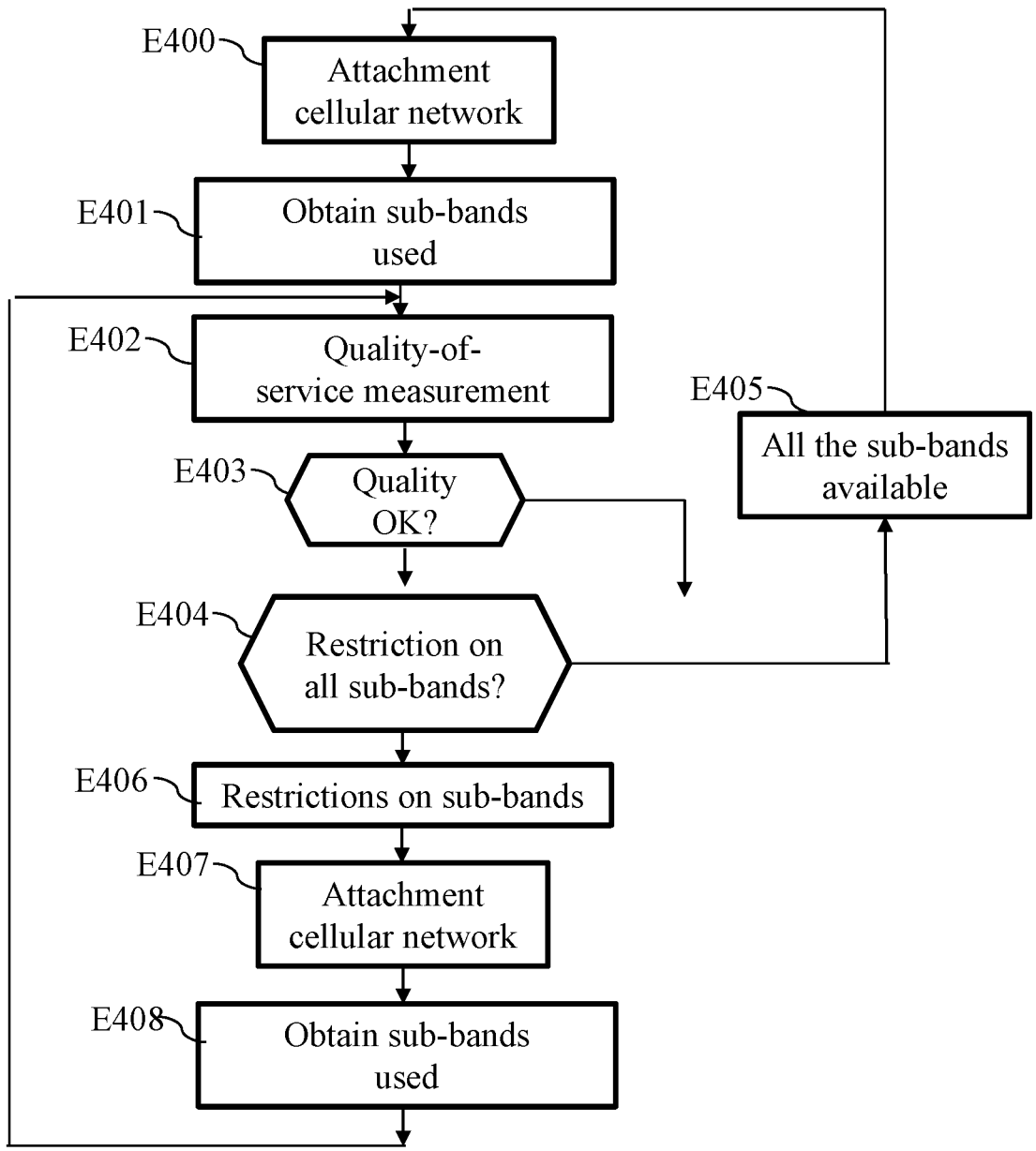
FIG. 4 depicts an example of an algorithm executed by the data concentrator according to the present invention.

All or part of the method described in relation to FIG. 4 can be implemented in software form by the execution of a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

Figure 3:
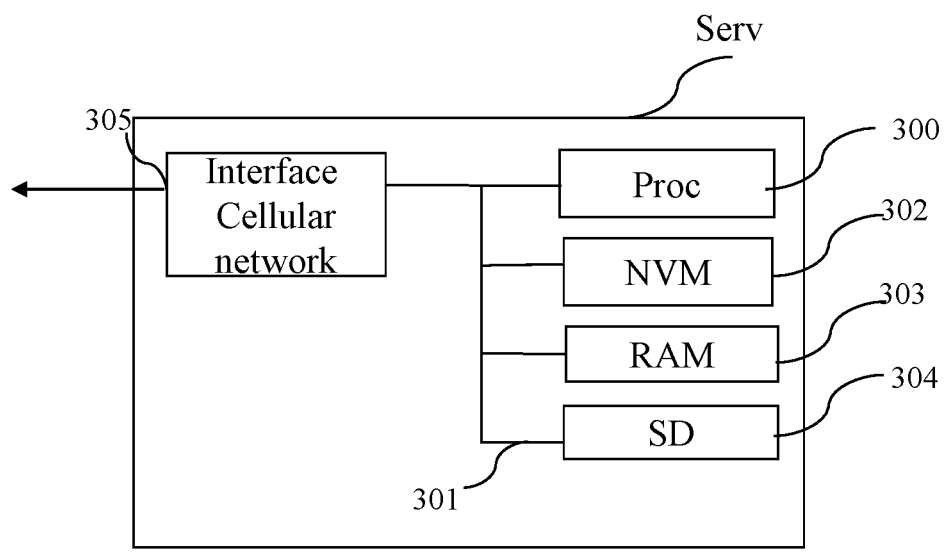
FIG. 3 depicts an example of architecture of a server wherein the present invention is implemented.

FIG. 3 shows an example of architecture of a server wherein the present invention is implemented.

The server Serv comprises:
- a processor, microprocessor or microcontroller 300;
- a volatile memory 303;
- a non-volatile memory NVM 302;
- optionally, a storage medium reader 304, such as an SD card (Secure Digital card) reader or a hard disk;
- a cellular network interface 305;
- a communication bus 301 connecting the processor 300 to the ROM memory 302, to the RAM memory 303, to the storage medium reader 304 and to the cellular network interface 305.

The cellular network interface 305 may be shared or not with other servers implementing the present invention. The cellular network interface 305 may thus be included in the server Serv or in another server or be physically separate from the server or servers implementing the present invention.

The processor 300 is capable of executing instructions loaded in the volatile memory 303 from the non-volatile memory 302, from an external memory (not shown), from a storage medium, such as an SD card or the like, or from a communication network. When the server Serv is powered up, the processor 300 is capable of reading instructions from the volatile memory 303 and executing them. These instructions form a computer program that causes the implementation, by the processor 300, of all or part of the method described in relation to FIG. 5.

Figure 5:
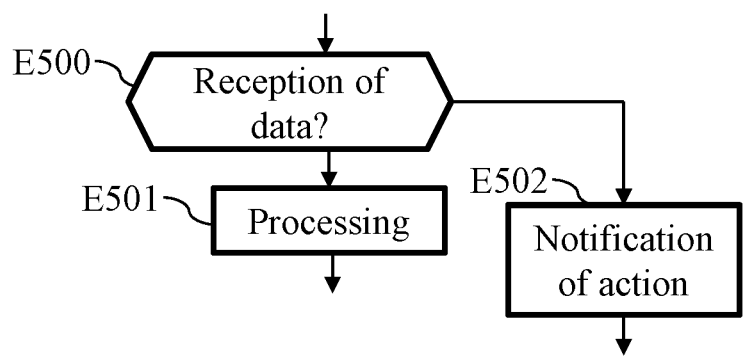
FIG. 5 depicts an example of an algorithm executed by the server according to the present invention.

All or part of the method described in relation to FIG. 5 can be implemented in software form by the execution of a set of instructions by a programmable machine, such as a DSP (digital signal processor) or a microcontroller or be implemented in hardware form by a machine or a dedicated component, such as an FPGA (field-programmable gate array) or an ASIC (application-specific integrated circuit).

FIG. 4 shows an example of an algorithm executed by the data concentrator according to the present invention.

The present algorithm is described in an example wherein it is executed by the processor 200 of the data concentrator Cd.

At the step E400, the cellular radio modem 205 establishes a communication using an algorithm in accordance with the part entitled "Automatic Network Selection Mode Procedure" of the 3GPP standard as defined in the 3GPP document TS 23.122 and chooses at least one frequency sub-band from among the frequency sub-bands of the frequency plane enabled for the transmission of data to the server.

In accordance with this standard, the cellular radio modem can choose frequency sub-bands according to criteria favouring a good voice communication quality rather than a good data communication quality.

At the step E401, the processor 200 obtains at least one frequency sub-band selected by the modem. For example, the processor 200 generates a predetermined command to the cellular network modem 205 in order to obtain the index of the frequency sub-band selected by the cellular network modem 205.

For example, the processor 200 generates a predetermined command to the cellular network modem 205 in order to obtain, for each frequency sub-band of the frequency plane, information indicating whether or not the frequency sub-band is used by the modem of the cellular network 205.

At the step E402, the processor 200 demands the making of quality-of-service measurements on the network to which the cellular radio modem is connected in order to obtain information representing the quality of service of the connection between the transmitter and the server.

For example, the processor 200 demands the transfer of one or more packets in accordance with the TCP protocol wherein the quantity of payload data is equal to the maximum quantity permitted by the TCP protocol, and the transfer of one or more packets in accordance with the TCP protocol wherein the quantity of payload data is equal to the minimum quantity permitted by the TCP protocol.

For example, the processor 200 demands the transfer of one or more packets in accordance with the UDP protocol wherein the quantity of payload data is equal to the maximum quantity permitted by the UDP protocol, and the transfer of one or more packets in accordance with the UDP protocol wherein the quantity of payload data is equal to the minimum quantity permitted by the UDP protocol.

For example, the processor 200 makes commands of the PING type in accordance with the ICMP protocol.

The processor 200 next makes measurements on the number of lost packets, the propagation times for the packets transmitted and the variation in the latency over time.

At the step E403, the processor 200 checks whether the information representing the quality of the connection between the transmitter and the server is superior to or equal to a predetermined quality level.

If the information representing the quality of the connection between the transmitter and the server is superior to or equal to the predetermined quality level, the processor 200 demands the transfer of data to the server Serv.

If the information representing the quality of service of the connection between the transmitter and the server is inferior to the predetermined quality level, the processor 200 passes to the step E404.

At the step E404, the processor 200 checks whether all the sub-bands of the frequency plane have been prohibited.

If so, the processor 200 passes to the step E405. If not, the processor 200 passes to the step E406.

At the step E405, the processor 200 generates a command, intended for the modem, enabling selection of each frequency sub-band of the frequency plane.

Once this step has been performed, the algorithm returns to the step E400.

At the step E406, the processor 200 generates a command, intended for the modem, prohibiting selection of at least one frequency sub-band previously selected.

The prohibition of selection is for example made for all the frequency sub-bands associated with the 4G network if these have been selected by the modem or for only some of the frequency sub-bands selected by the modem.

At the step E407, the cellular radio modem 205 establishes a communication with the server Serv and chooses at least one frequency sub-band from among the frequency sub-bands of the frequency plane not prohibited for the transmission of data to the server Serv.

At the step E408, the processor 200 obtains at least one frequency sub-band selected by the modem in the same way as that described with reference to the step E401.

Once this operation has been performed, the present algorithm returns to the step E402.

FIG. 5 shows an example of an algorithm executed by the server according to the present invention. The present algorithm is described in an example in which it is executed by the processor 300 of the server Serv.

At the step E500, the processor 300 checks whether data are received from the data concentrator Cd during a predetermined period of time, for example equal to 24 hours.

If so, the processor 300 passes to the step E501 and processes the data received.

If not, the processor 300 demands the generation of an alarm message so that an action is performed on the data concentrator, for example for installation of a more efficient radio antenna.

The invention claimed is:

1. A method for the transmission of data from a data transmitter to a server with at least one predetermined quality-of-service level, the data being transmitted by means of a cellular network using frequency sub-bands, wherein said method causes:

selecting, by a modem of the transmitter, at least one sub-band from among the frequency sub-bands of a frequency plane enabled for the transmission of data to the server, obtaining, by the transmitter, at least one selected frequency sub-band, obtaining information representing a quality of service of a connection between the transmitter and the server, checking, by the transmitter, whether the information representing the quality of service of the connection between the transmitter and the server is superior to or equal to a predetermined quality level, transferring, by the transmitter, of the data to the server if the information representing the quality of service of the connection between the transmitter and the server is superior to or equal to the predetermined quality level, notifying to the modem, by the transmitter, of a prohibition of selection of at least one previously selected frequency sub-band if the information representing the quality of service of the connection between the transmitter and the server is not superior to or equal to a predetermined quality level, performing, by the transmitter, the selection, obtaining and notification steps as long as the information representing the quality of service of the connection between the transmitter and the server is not superior to or equal to the predetermined quality level, and if all the frequency sub-bands of the frequency plane are prohibited, the method further comprises notifying the modem by the transmitter, that the prohibited frequency sub-bands can again be selected and executing the selection, obtaining and notification steps as long as the information representative of the quality of service of the connection between the transmitter and the server is not greater than or equal to the predetermined quality level, wherein the server notifies a lack of reception of data from the transmitter.

2. The method according to claim 1 wherein the information representing the quality of service of the connection between the transmitter and the server is determined:

by sending one or more data packets in accordance with TCP or UDP protocol, a quantity of payload data of which is equal to a maximum quantity permitted by the TCP or UDP protocol, by sending one or more data packets in accordance with the TCP or UDP protocol, a quantity of payload data of which is equal to the minimum quantity permitted by the TCP or UDP protocol, and by measuring a number of lost packets, propagation delays of transmitted packets and a variation in latency over time.

3. The method according to claim 1, wherein the transmitter is included in a data concentrator concentrating data received from a plurality of electricity meters.

4. A non-transitory storage medium that stores a computer program comprising instructions for implementing, by a device, the method according to claim 1, when said computer program is executed by a processor of said device.

5. A system for the transmission of data from a data transmitter to a server with at least one predetermined quality-of-service level, the data being transmitted by means of a cellular network using frequency sub-bands, wherein the system comprises circuitry causing the system to perform:

selecting, by a modem of the transmitter, at least one sub-band from among the frequency sub-bands of a frequency plane enabled for the transmission of data to the server, obtaining, by the transmitter, at least one frequency sub-band selected, obtaining information representing a quality of service of a connection between the transmitter and the server, checking by the transmitter, whether the information representing the quality of service of the connection between the transmitter and the server is superior to or equal to a predetermined quality level, transferring by the transmitter of data to the server if the information representing the quality of service of the connection between the transmitter and the server is superior to or equal to the predetermined quality level, notifying, by the transmitter to the modem of a prohibition of selection of at least one previously selected frequency sub-band if the information representing the quality of service of the connection between the transmitter and the server is not superior to or equal to a predetermined quality level, activating by the transmitter the selecting, obtaining and notifying means as long as the information representing the quality of service of the connection between the transmitter and the server is not superior to or equal to the predetermined quality level, notifying by the server of an absence of reception of data from the transmitter, and notifying the modem by the transmitter, that the prohibited frequency sub-bands can again be selected and execution of the selection, obtaining and notification steps as long as the information representative of the quality of service of the connection between the transmitter and the server is not greater than or equal to the predetermined quality level, wherein the server notifies a lack of reception of data from the transmitter if no data is received during a predetermined time period by the server.

* * * * *